United States Patent [19]
Börjesson

[11] Patent Number: 6,068,435
[45] Date of Patent: May 30, 2000

[54] GOODS HANDLING SYSTEM

[75] Inventor: Kjell Börjesson, Alafors, Sweden

[73] Assignee: Wiab Widholms Industri AB, Lysekil, Sweden

[21] Appl. No.: 09/214,211

[22] PCT Filed: Jul. 9, 1997

[86] PCT No.: PCT/SE97/01255

§ 371 Date: Dec. 30, 1998

§ 102(e) Date: Dec. 30, 1998

[87] PCT Pub. No.: WO98/01381

PCT Pub. Date: Jan. 15, 1998

[30] Foreign Application Priority Data

Jul. 9, 1996 [SE] Sweden .................................. 9602712

[51] Int. Cl.[7] .................................................. B63B 27/10
[52] U.S. Cl. .................................. 414/139.9; 414/140.1; 414/140.3; 414/140.4; 414/141.3; 414/137.4; 212/325; 212/326
[58] Field of Search .............................. 414/139.4, 139.9, 414/140.1, 140.3, 140.4, 141.3, 137.4; 104/114; 14/71.1, 71.3, 74; 212/325, 326

[56] References Cited

U.S. PATENT DOCUMENTS

| | | | |
|---|---|---|---|
| 631,717 | 8/1899 | Hulett | 414/139.4 |
| 4,172,685 | 10/1979 | Nabeshima et al. | 414/140.3 |
| 4,878,796 | 11/1989 | Ammeraal . | |
| 4,897,012 | 1/1990 | Brewer | 414/140.3 |
| 4,946,344 | 8/1990 | Prins | 414/140.3 |
| 5,197,843 | 3/1993 | Eckel . | |
| 5,343,739 | 9/1994 | Curry | 212/325 |
| 5,456,560 | 10/1995 | Rudolf, III et al. | 414/140.3 |
| 5,570,986 | 11/1996 | Hasegawa et al. | 414/140.3 |
| 5,775,866 | 7/1998 | Tax et al. | 414/140.3 |
| 5,931,625 | 8/1999 | Tax et al. | 414/139.9 |
| 5,951,226 | 9/1999 | Fantuzzi | 414/139.9 |

FOREIGN PATENT DOCUMENTS

| | | |
|---|---|---|
| 07407643 | 1/1991 | European Pat. Off. . |
| 0471411 | 2/1992 | European Pat. Off. . |
| 0573380 | 12/1993 | European Pat. Off. . |
| 1-294121 | 11/1989 | Japan .................. 414/140.3 |
| 1236247 | 6/1971 | United Kingdom .................. 212/325 |
| WO 89/04286 | 5/1989 | WIPO . |

Primary Examiner—Douglas Hess
Attorney, Agent, or Firm—Samuels, Gauthier & Stevens, LLP

[57] ABSTRACT

The present invention is a goods handling system incorporating a mobile unit for loading and unloading goods, preferably positioned on load carriers, to and from a ship. The unit incorporates at least one substantially horizontal transport arm with at least one transport track arranged along it and at each end of a first and a second substantially vertical lifting device with a vertically adjustable loading platform. The second lifting device is constituted by a line system arranged in the upper part of the transport arm having a free-hanging loading platform. The loading platform is provided with control means for guiding the platform into a receiving station at the end of a lifting phase to level with the transport track. On the transport arm above the transport track is arranged a traverse crane, the trolley of which is displaceable on a crane bridge arranged transversely to the longitudinal direction of the transport arm, which crane bridge is movable along fixed crane rails arranged in the longitudinal direction of the traverse crane.

10 Claims, 9 Drawing Sheets

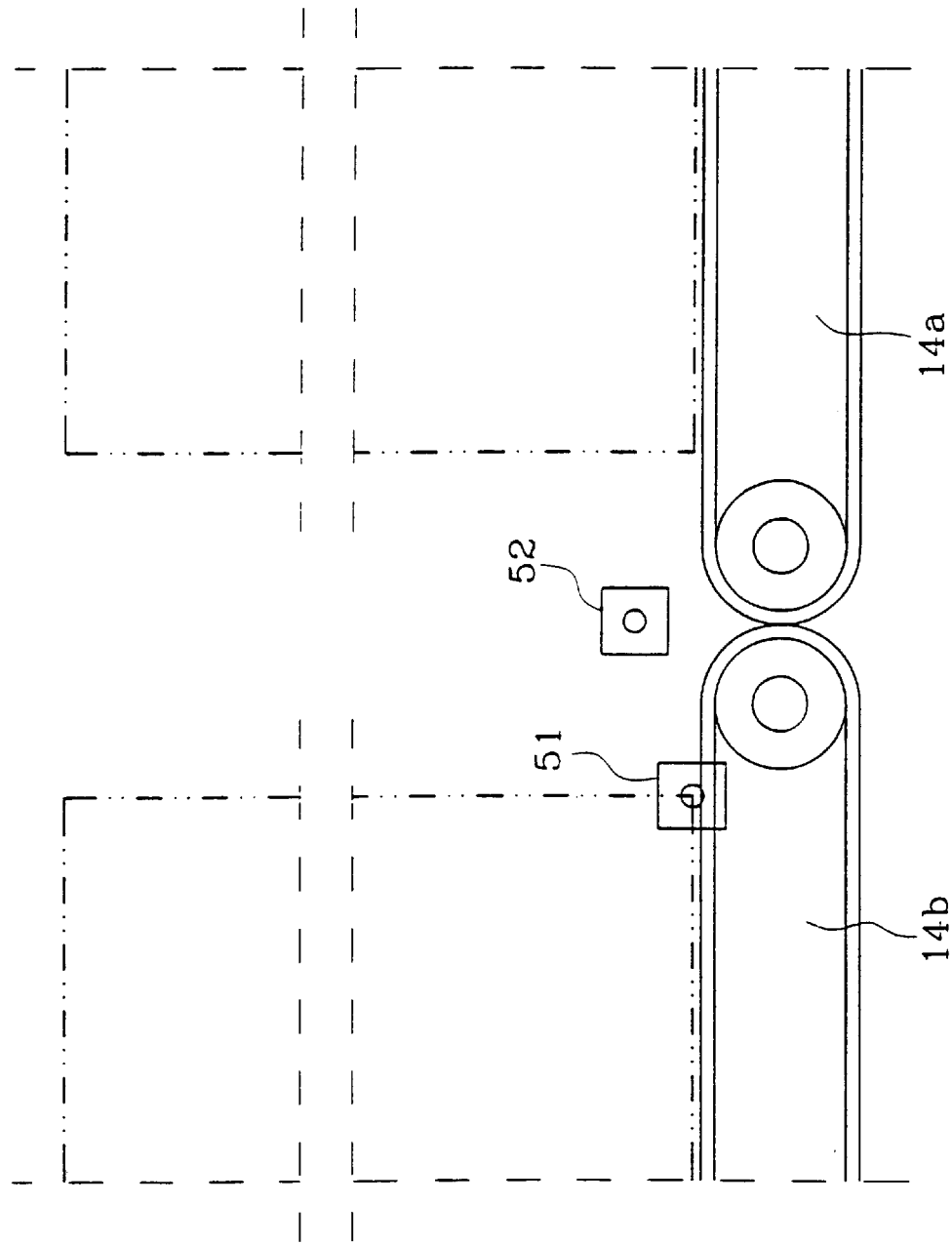

GOODS HANDLING SYSTEM

The present invention refers to a goods handling system incorporating a mobile unit for loading and unloading goods, preferably arranged on load carriers, e.g. pallets, to and from a ship or the like, and which unit incorporates at least one substantially horizontal transport arm with at least one transport track arranged along it and being equipped at each end thereof with a first and a second substantially vertical lifting device with a vertically adjustable load platform.

BACKGROUND OF THE INVENTION

Loading and unloading at transport of unit goods on load carriers, such as standard pallets is to a large extent still often done manually via available crane equipment, and it is very time consuming. Sometimes it has been shifted to containers, which method is an expensive means of transport, especially in the case of refrigerated goods, and the available loading space can not be utilised to a maximum extent.

From U.S. Pat. No. 4,878,796 is earlier known a goods handling system for loading and unloading ships, where a load cage for transport of the goods to and from the ship is guided by two guides located outside the load cage. The guides are heavy I-beams and have a length corresponding to the depth of the cargo hold plus the part required above the ship. This means that only the guide has such a large weight that it can be handled only by means of a crane. The lower end of the guides are placed on the bottom of the cargo hold, thereby forming a base for an elevator-like lifting device. At position adjustment of this lifting device it is necessary that the crane lifts the "elevator" somewhat, whereupon the telescopic transport arm can be extended or retracted. This is a rather circumstantial and time consuming operation, which furthermore requires that the crane is manned.

PURPOSE AND MOST ESSENTIAL FEATURES OF THE INVENTION

The purpose of the invention is to provide a goods handling system, the mobile unit of which is easily movable in transverse and longitudinal directions of the ship;
can be shifted between different ships and/or between different loading hatches;
significantly increases loading and unloading capacity with a minimum of personnel;
handles the goods weather protected and eventually if needed under thermally insulated conditions;
fits most existing ship sizes;
is computer controlled during the entire transport;
is independent of external aids, such as cranes;
can be operated by one person;
can be used as a ground bound mobile unit or as a unit integrated with the ship.

With use of the same automatic gear it shall furthermore be possible to incorporate the goods handling system in the other handling system on the quay, i.e. from the mobile unit via transport vehicles to the harbour warehouse or to freight wagons/containers and vice versa.

SOLUTION OF THE PROBLEM

These tasks have been solved in that the second lifting device is constituted by a line system arranged in the upper part of the transport arm and having a free-hanging load platform, that the load platform is equipped with guiding means for guiding the platform into a receiving station in level with the transport track at the end of the lifting phase, that the load platform is equipped with substantially horizontal, motor driven transporters, which are arranged to be activated when the platform is situated in the receiving station, and that upon the transport arm and above its transport track is provided a traverse crane, the trolley of which is displaceable on a crane bridge arranged transversally to the longitudinal direction of the transport arm, and which crane bridge is movable along a fixed trolley runway arranged in the longitudinal direction of the traverse crane.

DESCRIPTION OF THE DRAWINGS

Herebelow the invention will be further described in connection to some embodiments, with reference to the accompanying drawings.

FIG. 9 shows in bigger scale a part of a transport arm according to a modified embodiment.

DESCRIPTION OF EMBODIMENTS

Figure 1:
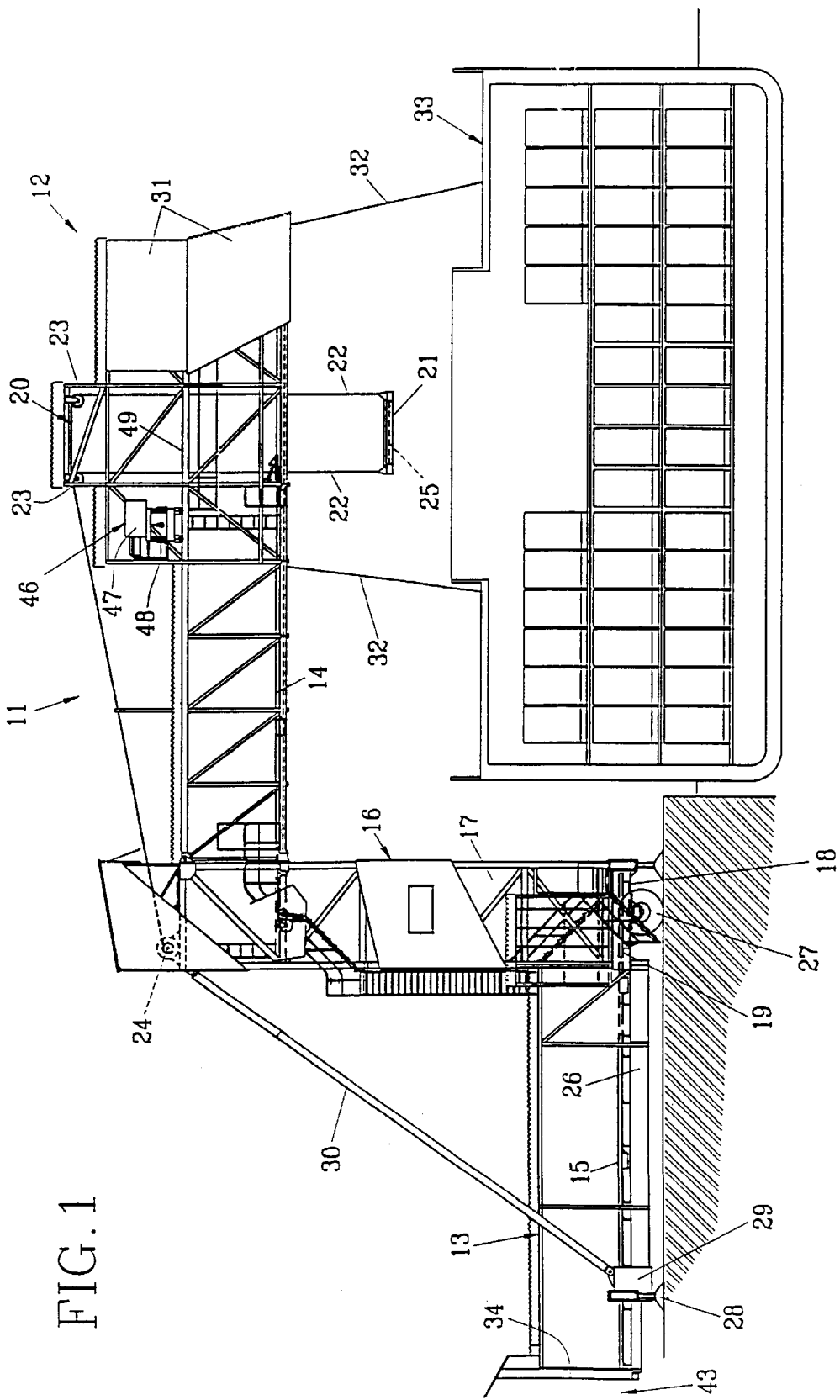
FIG. 1 shows the goods handling unit according to the invention in a side view during loading or unloading of a ship, which is shown in cross section.

The goods handling system is built up around a central, mobile handling unit 11, as a link between a ship and the quay, but also as a part in the continued transport from the quay via a transport vehicle to a harbour warehouse.

Hereinafter the same reference numeral will be used for the same detail in different embodiments.

Figure 2:
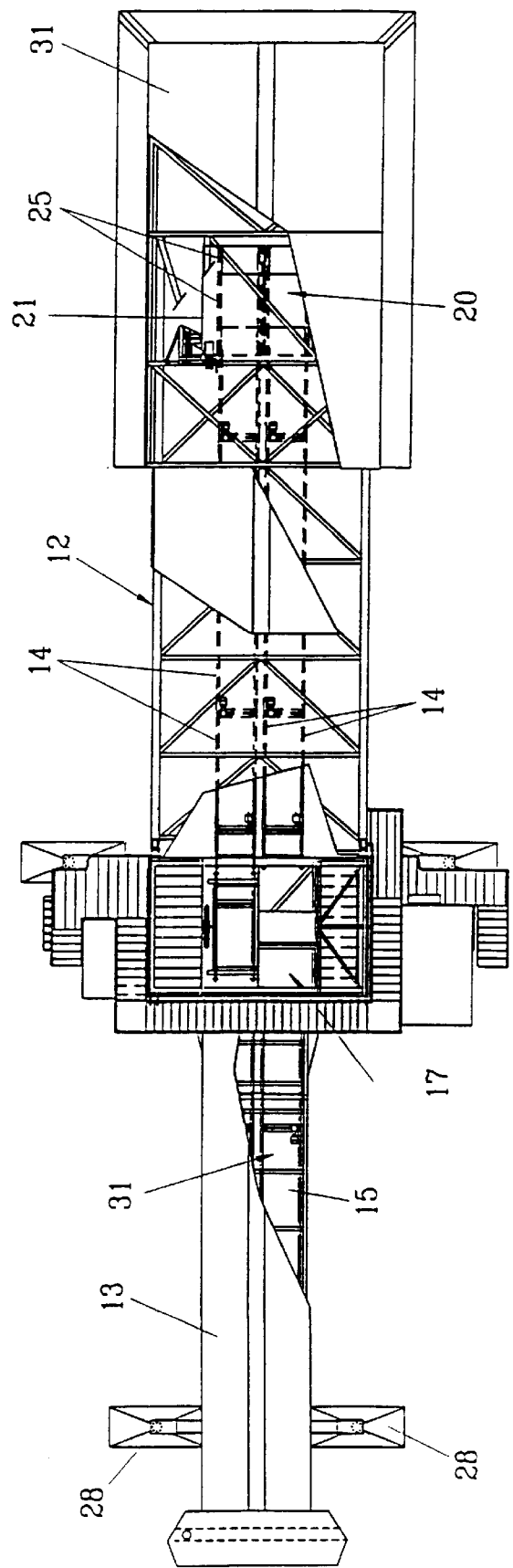
FIG. 2 shows the goods handling unit according to FIG. 1 in a view from above.
Figure 3:
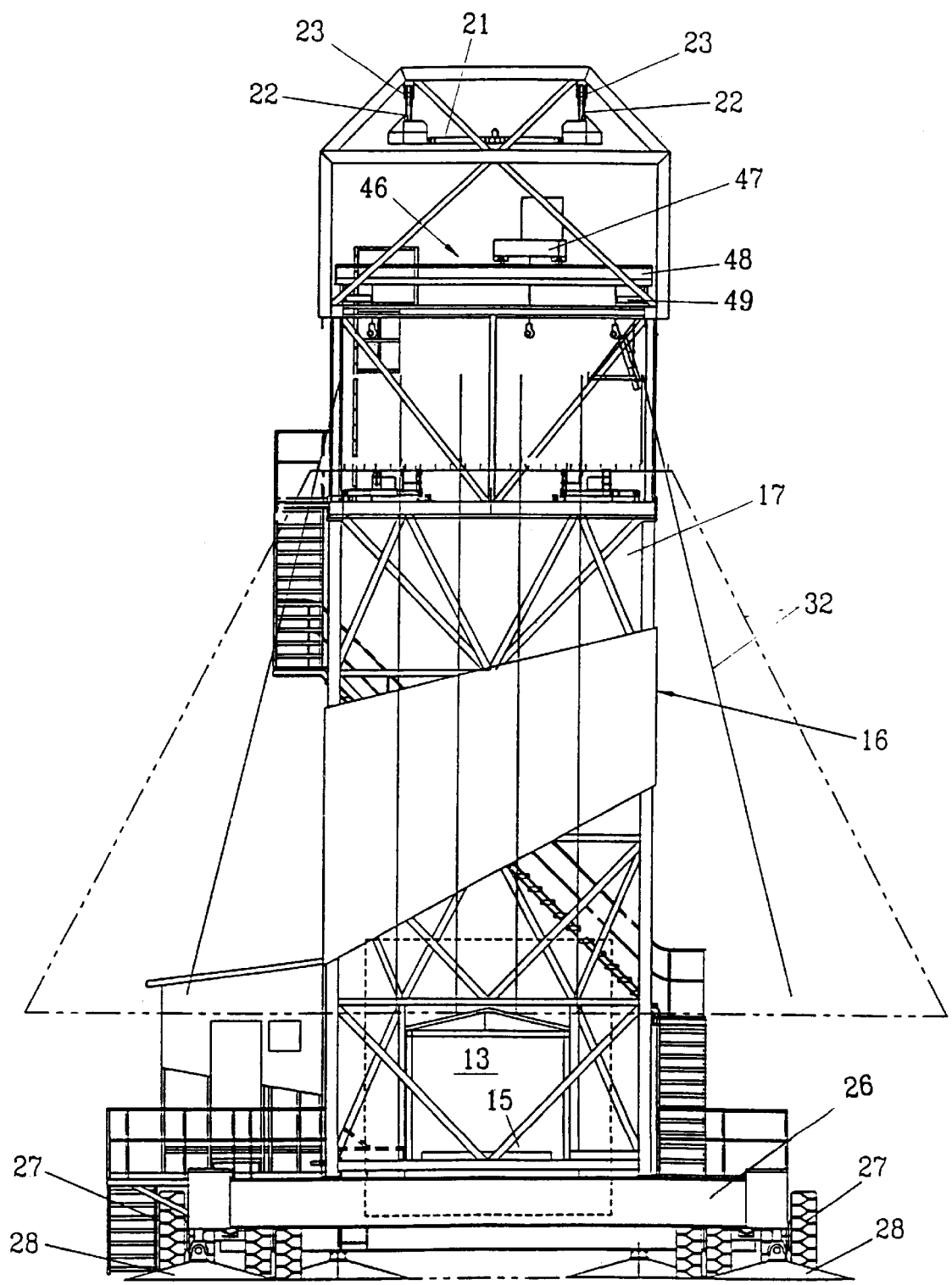
FIG. 3 shows the goods handling unit according to FIGS. 1 and 2 in a front view.

The goods handling unit 11 according to the embodiment shown in FIGS. 1–3, incorporates a first, upper, horizontal transport arm 12 and a second, lower transport arm 13, which support at least one transport track 14 and 15 each. Between these are provided a vertical column housing in which is provided a lifting device 17, e.g. an elevator, for further transport of the goods between the transport tracks 14 and 15. The transfer of the goods from a transport track to the elevator or vice versa, is effected by means of a transporter 19, e.g. endless conveyor belts, provided on the loading platform 18 of the elevator, and driven by their own motor, independent of the driving devices belonging to the transport tracks 14 and 15.

At the free end portion of the upper transport arm 12 is provided a second lifting device 20, which in principle has the same purpose as the elevator 17, but which lacks elevator guides and has a load platform 21 which is suspended in a line system 22, which via blocks 23 are led to a winch 24. The load platform 21 is equipped with guide means, which at the end of the lifting phase guide the platform to an exact position in relation to the upper edge of the upper transport track 14. The load platform 21 is equipped with transport means 25 for transfer of the goods to and from the load platform. The transport means 25 can consist of motor driven, endless conveyor belts, wheel tracks or the like. These are used only in the upper end position of the platform, in which the motor for the conveyor belts 25 is automatically connected to the electric mains.

The goods handling unit 11 is supported by a trolley 26, which in the embodiment shown is arranged on the lower side of the lower transport arm 13. The trolley incorporates a set of wheels 27, the wheel axle of which is positioned transversally to the longitudinal direction of the transport arm 13, substantially centrally under the elevator 17. At the opposite end of the trolley is provided vertically adjustable support legs 28 and heavy counterweights 29, which via braces 30 absorb the load from the freely extending upper transport arm 12 and the transport goods.

The transport arms 12 and 13 and the elevator 17 are covered by weather protections 31 against wind and weather and the load cargo opening is protected by tarpaulins 32 extending from the inner side of the upper transport arm 12, which can be mechanically wound up on rolls (not shown).

Below the blocks 23 on the upper side of the upper transport arm 12 is arranged a traverse crane 46, the trolley 47 of which is movable along a crane bridge 48 arranged transversally to the transport arm. This in turn is movable on fixed traverse tracks 49 arranged in the longitudinal direction of the transport arm 12.

Loading and unloading of a ship 33 is accomplished with the goods handling unit 11 according to the invention in the following manner. The goods on pallets is placed on the transport track 15 in the lower transport arm 13 from its end opening 34, either by means of a fork lift truck, directly from a container or goods wagon or from a transfer vehicle. The goods, e.g. two pallets in a row, is moved by the transport track 15 up to the lower elevator port, where it is sensed if the load platform is in its lowermost end position. If that is the case the transporter 19 of the elevator cage is started, at the same time as the transport track 15 moves the goods so far that the transporter 19 can pull the goods into the elevator. This can take e.g. four pallets at a time. When the goods has been moved up to level with the transport track 14 of the upper transport arm 12, the transporter 19 is again started, and pushes the goods out upon the transport track 14. During this time the load platform 21 of the second lifting device 20 has been brought to its upper position in level with the transport track 14, thus that the goods can be transferred to the load platform 21. This is preferably dimensioned thus that it can load four pallets at a time, which are thereupon lowered to the current loading level in the ship 37, wherein the pallets are taken care of by fork lift trucks or manually by means of fork lift carts for positioning in the cargo room. The same procedure but in reverse order is used at unloading. One operator can take care of an average of 200 to 250 pallets per hour. The operator controls from his operator position, which is situated in direct connection to the second lifting device, only the manoeuvring of the load platform 21 in the cargo room of the ship, whereas all other manoeuvring is automatized.

The work area of the traverse crane 46, which can be 4×7 meter, is so chosen, that a loading layer in the cargo room of the ship, which is completely filled, can be broken up from above. The pallets positioned latest will remain strapped at loading, thus that the hook of the traverse crane can be coupled to them and lifted. A lift fork is thereupon coupled to the hook for lifting as many pallets as necessary for allowing a fork lift truck to be positioned on the loading deck.

An important detail at loading and unloading of pallets is that these are so close beside each other as possible. When entering a pallet on the load platform it often happens that the pallets move apart a little, which can cause, that the hold is not used effectively. In order to avoid this, at least one of the transport tracks 14 is divided into two sections 14*a* and 14*b*, which are driven independent of each other. The drive unit of the second section 14*b* as seen in the direction of transport is controlled by two sensors 51, 52 detecting the goods and arranged one on each side of the end of one of the transport tracks and the beginning of the other transport track. If the pieces of goods are close together, the sensors produce no signal. If on the other hand there is a space between the pieces of goods the sensors will give a signal to the drive unit of the transport track 14*b* for stopping this, whereas the first transport track 14*a* continues to run. As the goods has reached the second sensor 52, the belt that has been stopped is restarted and the delay in the system means that the rearward goods will catch up with the front goods.

Adjustment of the goods handling unit in relation to the opening of the ship hatch is carried out transversally in that the entire goods handling unit 11 is moved on its wheels 27, e.g. by means of an appropriate pulling vehicle, which is coupled to the trolley 26 at its loading and unloading openings 34.

In certain cases the space available behind the goods handling unit is so limited, e.g. by existing buildings, that the necessary loading, unloading and manoeuvring space is missing. In order to be able to use the goods handling unit also in such situations the modified embodiment according to FIGS. 4–6 has been developed. It is essentially similar to the above described embodiment, for which reasons only differences will be discussed hereinafter.

Figure 4:
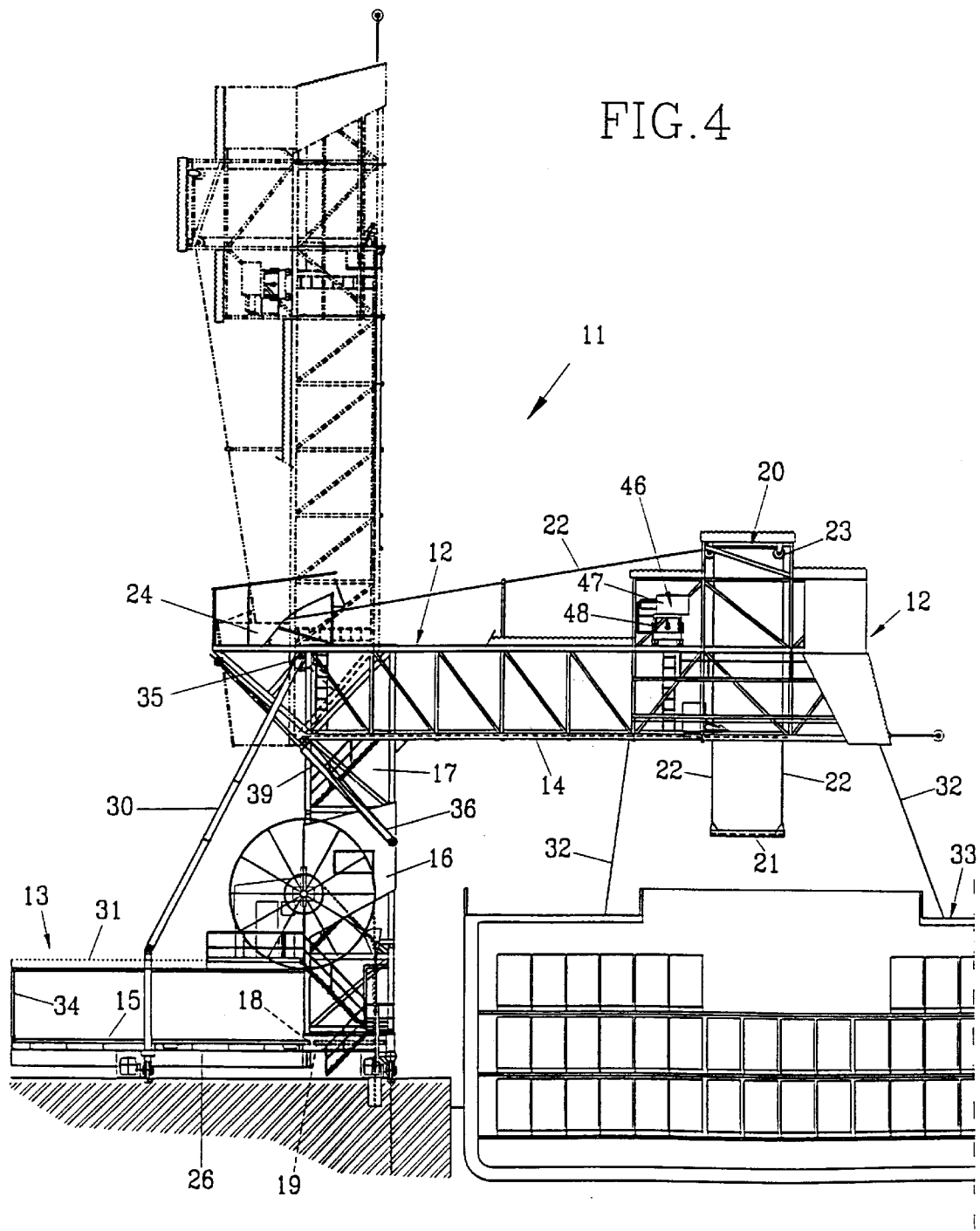
FIGS. 4, 5 and 6 are views corresponding to FIG. 1, 2 and 3 and showing a modified embodiment of the goods handling unit.
Figure 5:
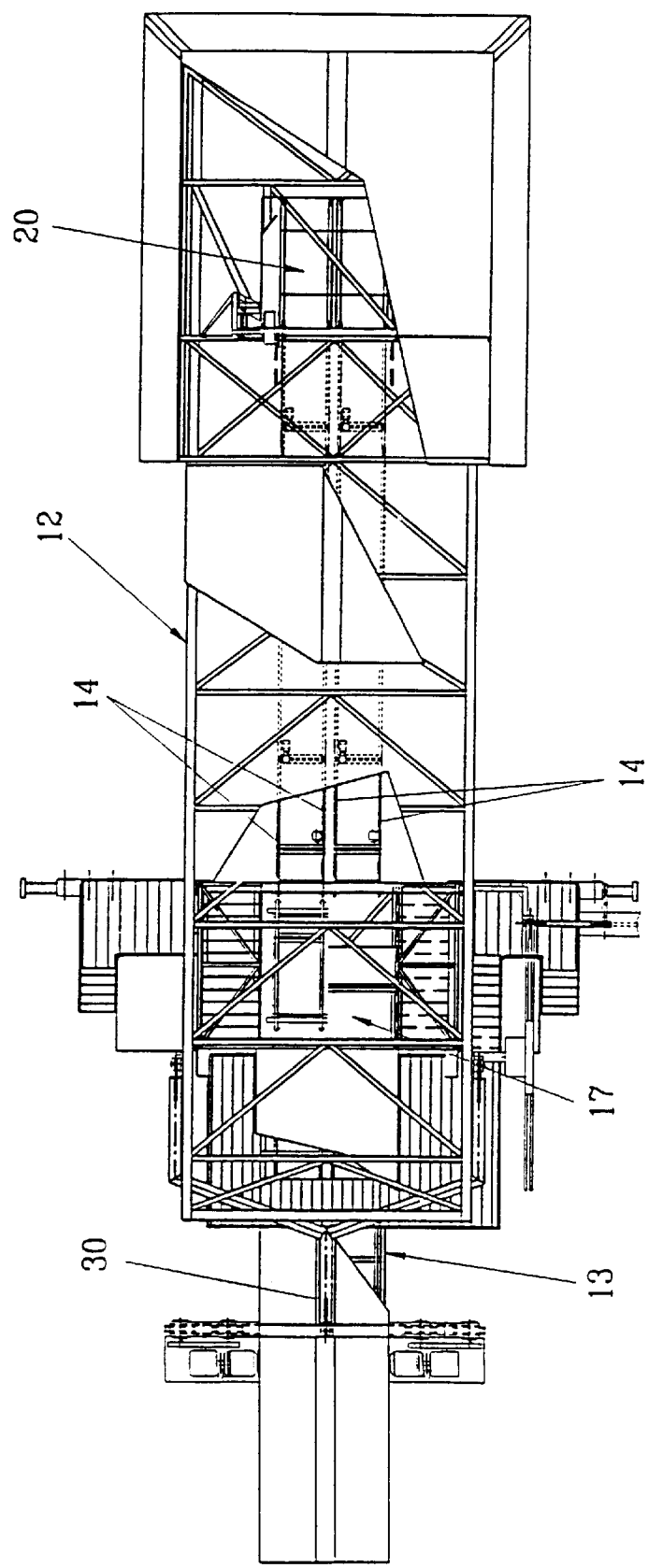
Figure 6:
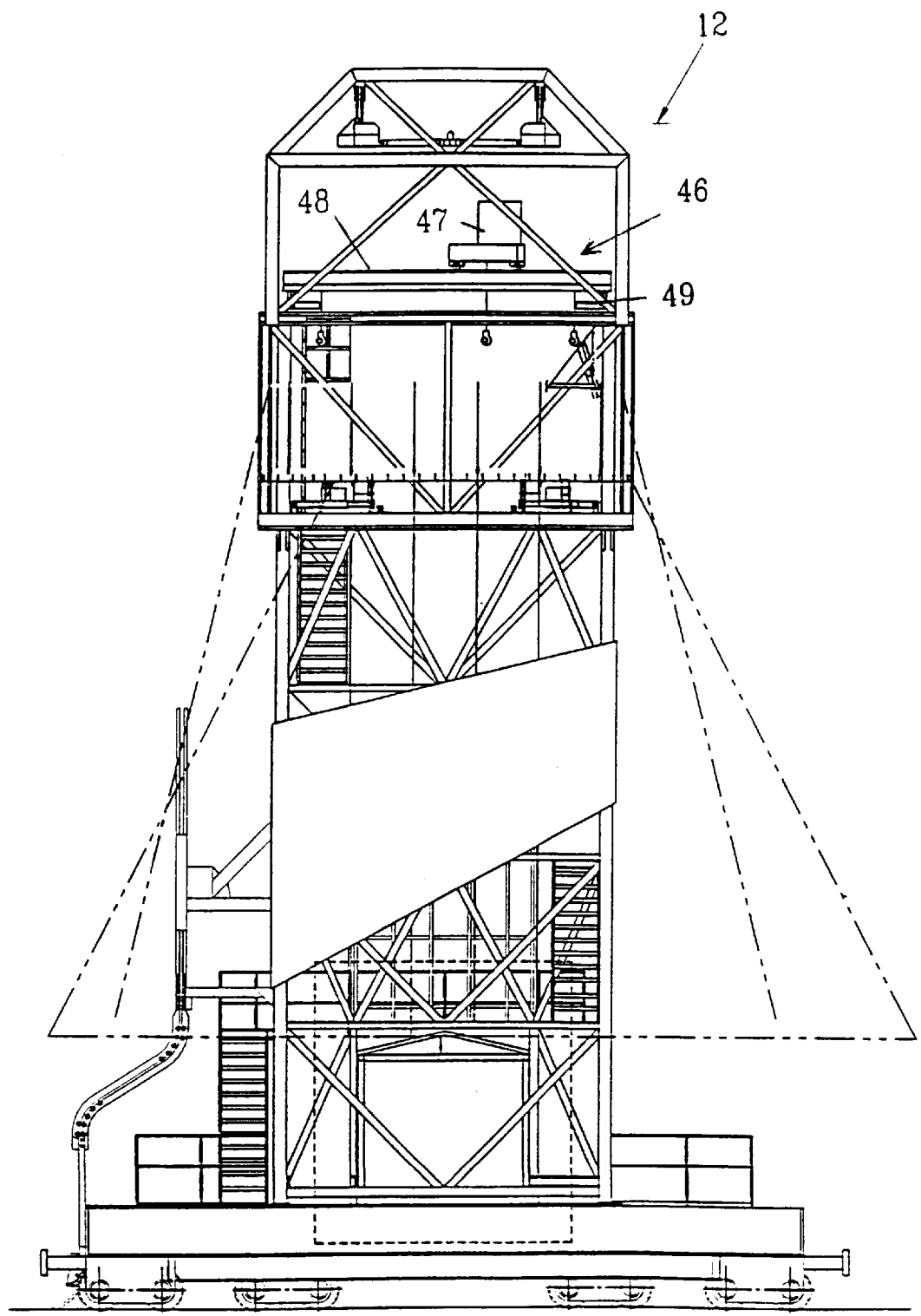

In contrast to FIGS. 1–3, where the goods handling unit is movable laterally to the length of the ship, in order to be clear of the ship, the unit according to FIGS. 4–6 is arranged on rails extending in the longitudinal direction of the ship. In order to move clear of the ship, the upper transport arm 12 is pivotable about a shaft 35, from an active, substantially horizontal position to a substantially vertical, passive position, shown with dash-and-dot lines in FIG. 4. The pivoting is carried out by means of appropriate actuators 36.

Instead of a rail bound trolley, this can be designed as a multi-axled ground transport vehicle, which possibly even can move by means of its own motor power. It is even possible to support the upper transport arm 12 by means of adjustable support legs against the ship deck during loading and unloading operations.

Figure 7:
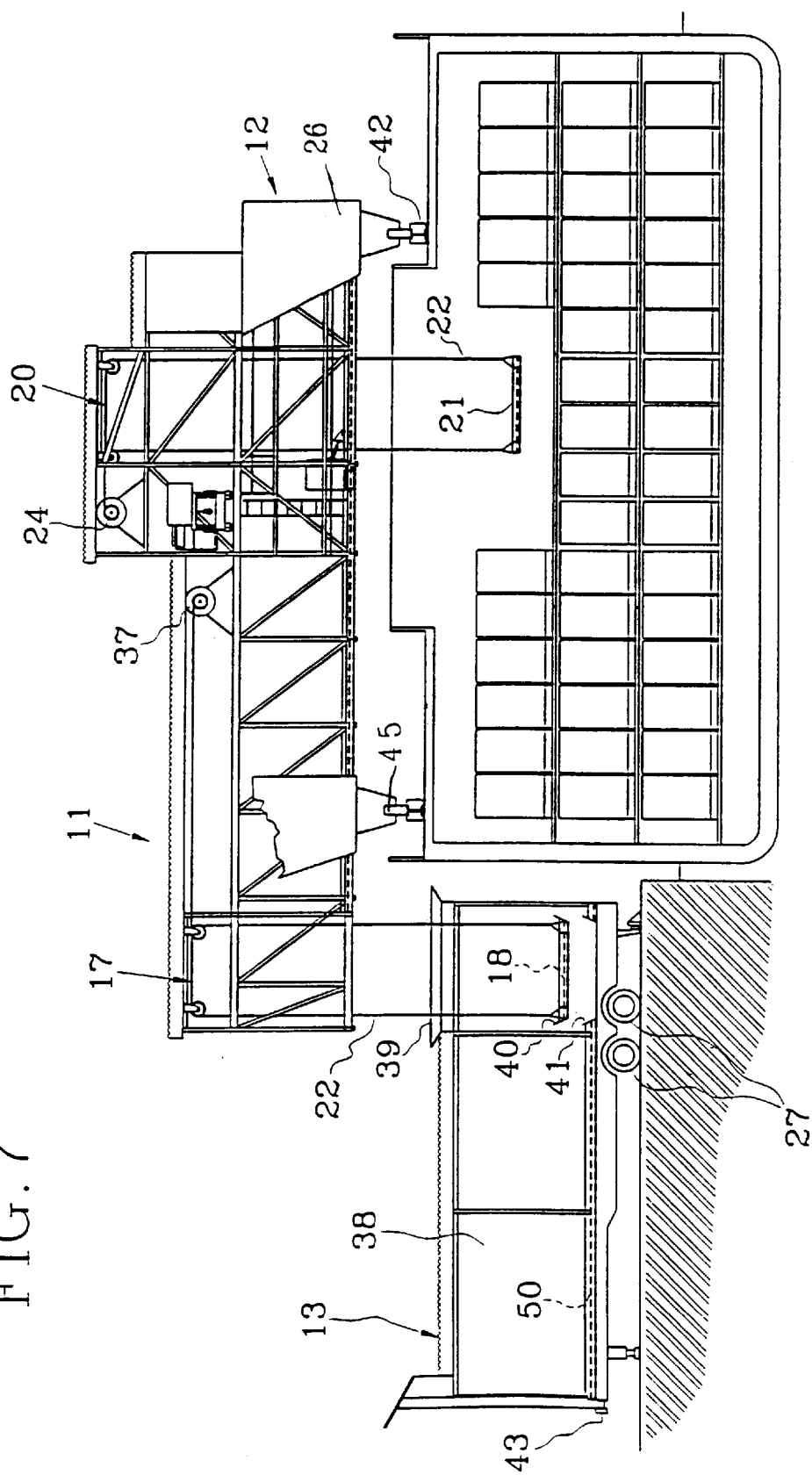
FIG. 7 shows a side view of a third embodiment, which is mounted on a ship.
Figure 8:
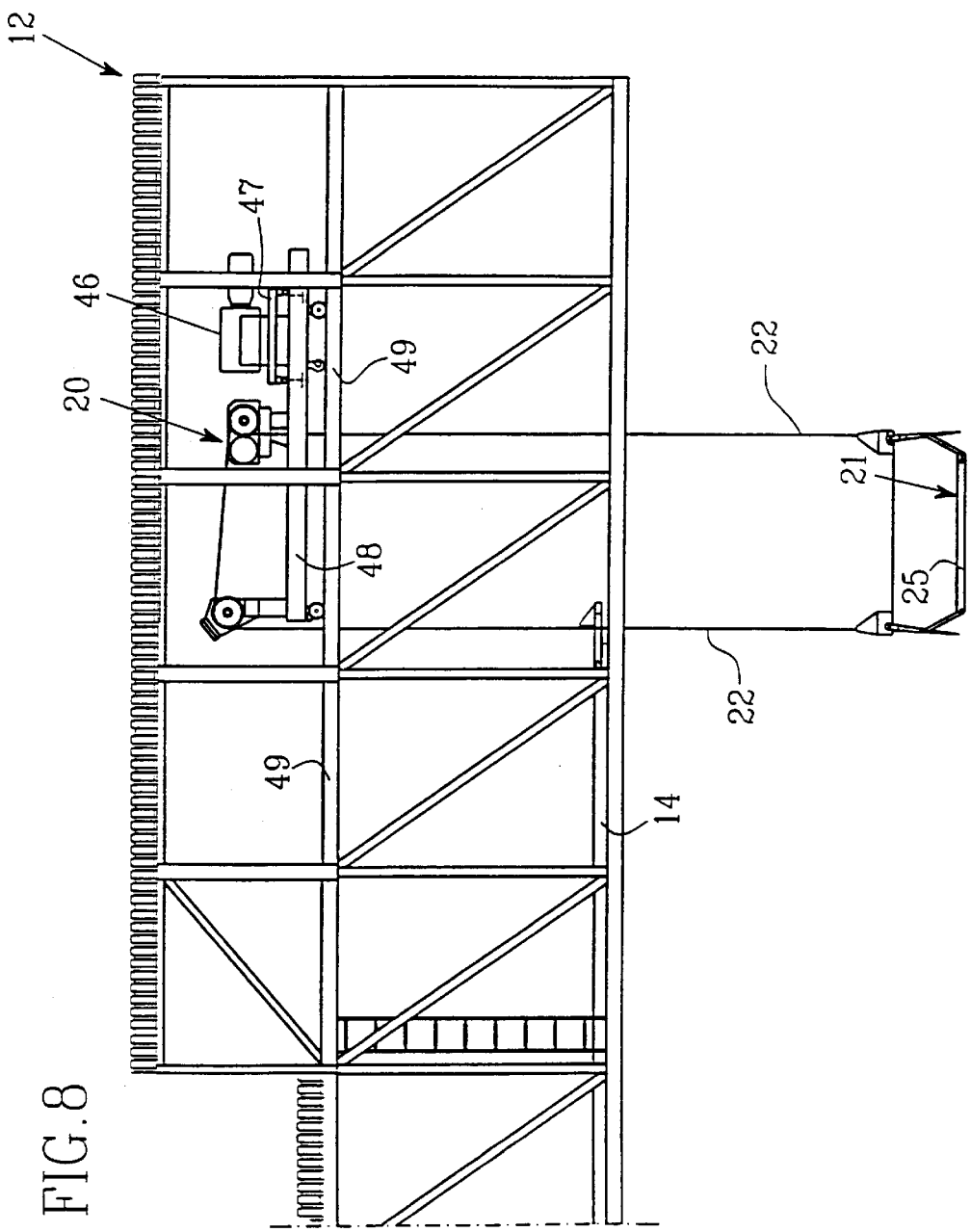
FIG. 8 shows in bigger scale a part of a transport arm according to a modified embodiment.

In a third embodiment, shown in FIG. 7, the goods handling unit 11 is positioned on the deck of the ship with the upper transport arm 12 straddling the hold covers of the ship and being movable on rails 42 in the longitudinal direction of the ship. The first and second lifting device 17 and 20 are of the same type, i.e. the load platforms 18 and 21 are hanging freely in one system of lines 22 each, and each comprising four wires connected to winches 37 and 24. The second, lower transport arm 13 is separated from the goods handling unit 11 and is constituted by a free standing, covered pulling vehicle 38, on the load platform of which, in the same manner as at the fixed arm 13 in the previous example, a transport track 15 is provided. In the roof of the cover of the pulling vehicle is provided a closable opening 39, through which the loading platform 18 of the lifting device 17 can be raised and lowered. It is equipped with control means 40 for guiding it into a receiving apparatus 41 on the load platform of the pulling vehicle. Loading and unloading is effected in the same manner as described above in connection with FIGS. 1–3, but with the difference, that the transport arm 13, which is designed as a pulling vehicle 38 can be driven away, e.g. to a harbour warehouse for unloading the goods. For this purpose docking apparatuses 43 are provided at one of the open ends of the pulling vehicle, and fitting to corresponding docking apparatuses at a container, a trailer, the loading and unloading platform of the harbour warehouse or the like (not shown).

The transport arm 12 is stowed on deck transversally in that it is lifted from the rails and its length is adapted to the breadth of the ship. The other transport arm 13. i.e. the pulling vehicle 38 can also be lifted aboard, but in more often frequented harbours these can also be permanently positioned there.

Of course the transport arm needs not be rail-bound on the ship's deck, but can be lifted aboard by means of a crane and be positioned on vertically adjustable support legs. The entire goods handling unit thus may be ashore and be used for all existing types of ships. An advantage with this embodiment is that it is lighter and has shorter horizontal transport paths, whereby loading and unloading can be accomplished faster. On the other hand it requires a lifting crane.

In the previous embodiments, the drive means—the traverse crane 24—of the loading platform 21, which is supported by the system of lines 22, is positioned in the column housing 16. According to the embodiment shown in FIG. 10 the drive unit 24 is positioned on the crane bridge 48 of the traverse crane 46, which by an electric motor can be transferred along the traverse track 49 between two end positions. This means that the transport arm 12 does not need to be telescopically extendable, at the same time as the traverse crane can be moved to its inner end position, when the transport arm shall be pivoted up to its passive position. This position can be in close connection to the pivot centre of the transport arm.

The invention is not limited to the embodiments described and shown, but can be varied within the scope of the claims.

I claim:

1. A goods handling system, incorporating a mobile unit for loading and unloading goods, positioned on load carriers, and which unit incorporates at least one substantially horizontal transport arm, with at least one transport track arranged therealong and at each end thereof a first and a second substantially vertical lifting device with vertically adjustable load platform wherein, the second lifting device comprises a line system provided in the upper part of the transport arm with a free-hanging loading platform, the loading platform is equipped with control means for guiding the loading platform to a receiving station after lifting at level with the transport track, the loading platform is equipped with substantially horizontal, motorized transporters, which are arranged to be activated when the platform is situated in the receiving station, and that on the transport arm and above its transport track is provided a traverse crane having a trolley which is movable on a crane bridge that is arranged transversally to the longitudinal direction of the transport arm, said crane bridge being movable along fixed crane rails provided in the longitudinal direction of the traverse crane.

2. The system according to claim 1, wherein the unit incorporates two substantially horizontal transport arms situated at different levels thus defining upper and lower transport arms, the lower transport arm being configured as a ground vehicle with at least one wheel axle, the wheel axle being arranged transversely to the longitudinal direction of the transport arm.

3. The system according to claim 2, wherein the upper transport arm is designed as a free supporting beam, said free supporting beam being pivotably supported at an inner end, and being arranged to be pivoted from a substantially horizontal, active position to a substantially vertical, passive position.

4. The system according to claim 1, wherein the second lifting device includes a driving device that is positioned on the trolley of the traverse crane or its crane bridge.

5. The system according to claim 1, wherein the transport arm is equipped with a chassis provided with wheels for displacement of the unit on the ground and/or on a deck of a ship.

6. The system according to claim 1, wherein the transport track and the lifting devices are covered by fixed weather protections, and a weather protection which can be rolled up is connectable to the transport arm and is intended to cover the goods handling area between the transport arm and the hold cover of a ship and/or a transport vehicle.

7. The system according to claim 1, further comprising a transport vehicle, wherein the end of the lower transport arm turned away from the lifting device is provided with docking means for connection of said transport vehicle, and with vertically adjustable supporting legs.

8. The system according to claim 7, wherein the transport vehicle is provided with docking means corresponding to the docking means of the lower transport arm, and motorized transport tracks are provided in the transport vehicle, and which are designed to cooperate during docking operations with the transport tracks of the transport arm, thus that a direct transfer of goods between them is possible.

9. The system according to claim 8, wherein the docking means of the transport vehicle are configured to fit into the corresponding docking means provided at the door of a harbour warehouse, and to transport tracks arranged in connection to this door in the harbour warehouse for receiving or discharging the goods.

10. The system according to claim 1, wherein the transport track/tracks are divided into at least two sections that can be driven independently of each other, a driving unit of one section being controlled by two sensors detecting the goods, and provided at a predetermined distance from each other, such that if the space between two pieces of goods exceeds said predetermined distance, the forward one of the sections as seen in the direction of transport is stopped for so long that goods on the other section has caught up with goods on the forward section.

\* \* \* \* \*